US 7,143,072 B2

(12) United States Patent
Masgonty et al.

(10) Patent No.: US 7,143,072 B2
(45) Date of Patent: Nov. 28, 2006

(54) METHOD AND A SYSTEM FOR CALCULATING THE VALUES OF THE NEURONS OF A NEURAL NETWORK

(75) Inventors: Jean-Marc Masgonty, Marin (CH); Philippe Vuilleumier, Yverdon (CH); Peter Masa, Les Hauts-Geneveys (CH); Christian Piguet, Neuchatel (CH)

(73) Assignee: CSEM Centre Suisse d'Electronique et de Microtechnique SA, Neuchatel (CH)

( * ) Notice: Subject to any disclaimer, the term of this patent is extended or adjusted under 35 U.S.C. 154(b) by 575 days.

(21) Appl. No.: 10/255,396

(22) Filed: Sep. 26, 2002

(65) Prior Publication Data

US 2003/0061184 A1 Mar. 27, 2003

(30) Foreign Application Priority Data

Sep. 27, 2001 (EP) .................................. 01402488

(51) Int. Cl.
*G06E 1/00* (2006.01)
(52) U.S. Cl. ......................................... 706/31; 706/41
(58) Field of Classification Search .................. 706/31, 706/27; 703/31
See application file for complete search history.

(56) References Cited

U.S. PATENT DOCUMENTS 5,764,860 A * 6/1998 Yatsuzuka .................... 706/25
5,768,476 A * 6/1998 Sugaya et al. ................ 706/26

FOREIGN PATENT DOCUMENTS

EP 0459276 A2 12/1991

EP 0595033 A2 5/1994

OTHER PUBLICATIONS

"Multi-layer perceptrons with discrete weights", Marchesi, M.; Orlandi, G.; Piazza, F.; Pollonara, L.; Uncini, A.; Neural Networks, 1990., 1990 IJCNN International Joint Conference on Jun. 17-21, 1990 pp. 623-630 vol. 2.*
"Rectangular parallelepiped coding: A volumetric representation of three-dimensional objects", Yeon Kim; Aggarwal, J.; Robotics and Automation, IEEE Journal of [legacy, pre—1988], vol. 2, Issue 3, Sep. 1986 pp. 127-134.*
"Identification of 3D Objects Using Multicolored Grid Coding", A. Takenouchi, M. Nakajima, Systems and Computers in Japan, vol. 29, Issue 4, 1998, pp. 60-69.*
"Simulation of a Digital Neuro-Chip for Spiking Neural Networks", T. Schoenauer, S. Atasoy, N. Mehrtash, & H, Klar, IEEE International Joint Conference on Neural Networks (IJCNN), Como (Italy), Jul. 2000.*
"A Large-Signal Characterization of an HEMT Using a Multilayered Neural Network", K. Shirakawa, M. Shimiz, N. Okubo, & Y. Daido, IEEE Transactions on Microwave Theory and Techniques, vol. 45, No. 9, Sep. 1997, pp. 1630-1633.*

(Continued)

*Primary Examiner*—David Vincent
*Assistant Examiner*—Mai T. Tran
(74) *Attorney, Agent, or Firm*—Jacobson Holman PLLC

(57) ABSTRACT

A neural network having layers of neurons divided into sublayers of neurons. The values of target neurons in one layer are calculated from sublayers of source neurons in a second underlying layer. It is therefore always possible to use for this calculation the same group of weights to be multiplied by respective source neurons related thereto and situated in the underlying layer of the neural network.

17 Claims, 3 Drawing Sheets

OTHER PUBLICATIONS

Learning Object Models from Graph Templates by Ali Reza Mirhosseini, Hong Yan, Journal of Electronic Imaging 6(3). 294-302 (Jul. 1997).

Ann Implementation of Stereo Vision Using A Multi-Layer Feedback Architecture by Madjid S. Mousavi and Robert J. Schalkoff, IEEE Transactions on Systems, Man, and Cybernetics, vol. 24 No. 8, Aug. 1994, New York, US.

Phoneme-Based Word Recognition by Neural Network—A Step Toward Large Vocabulary Recoginition—by Akihiro Hirai and Alexander Waibel.

* cited by examiner

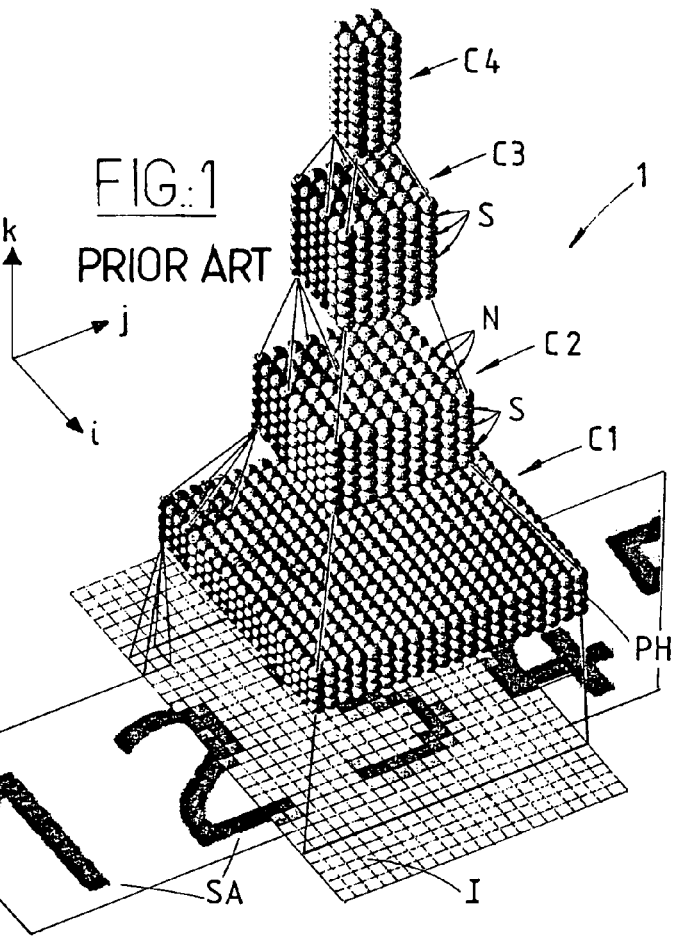
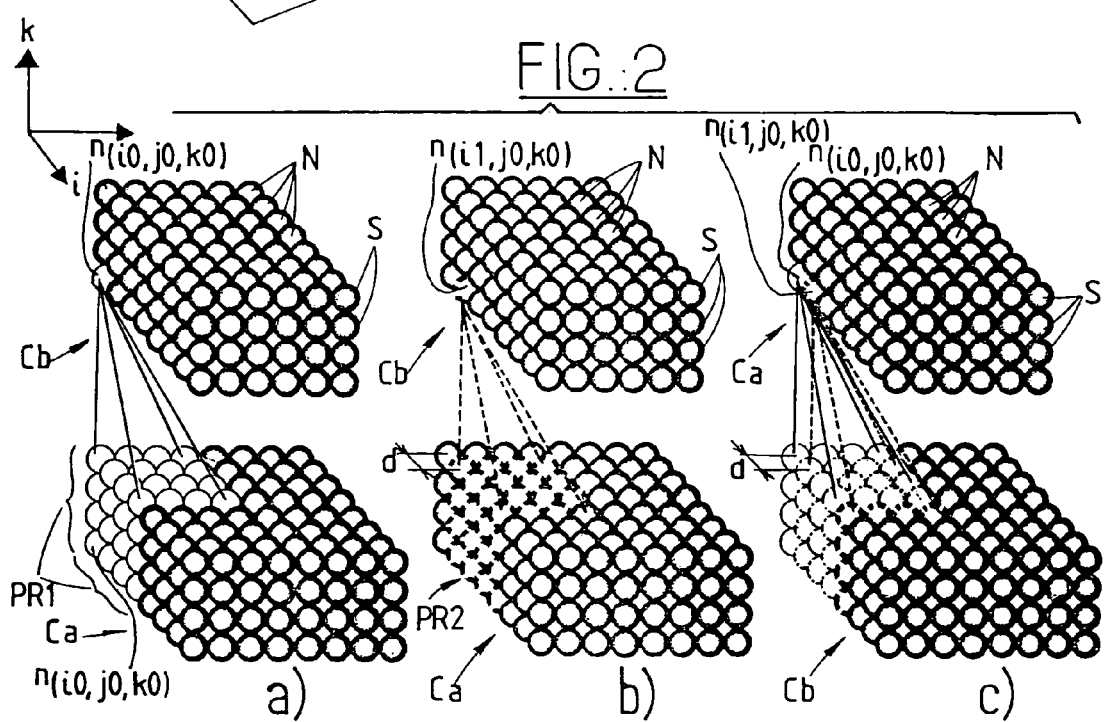

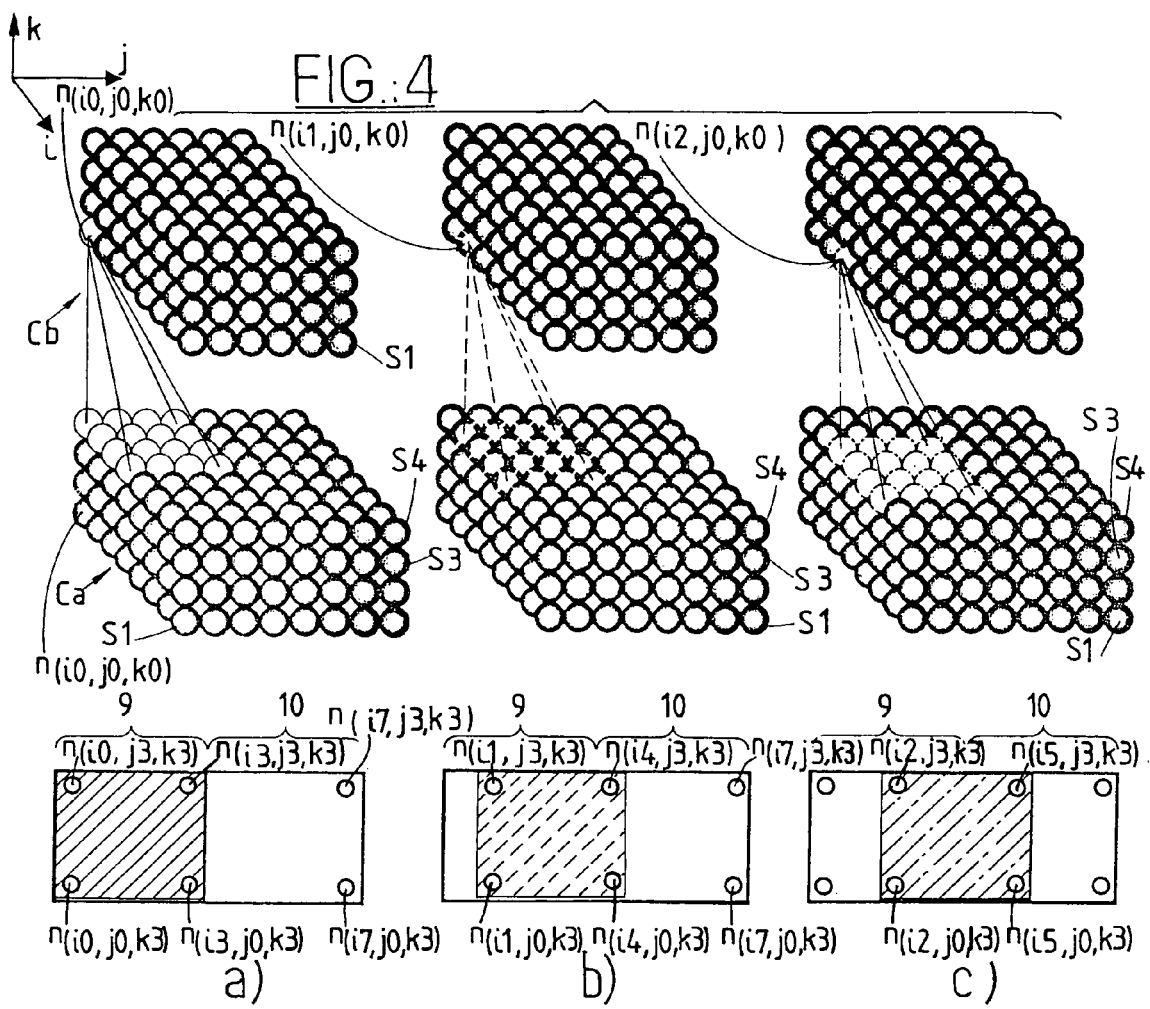
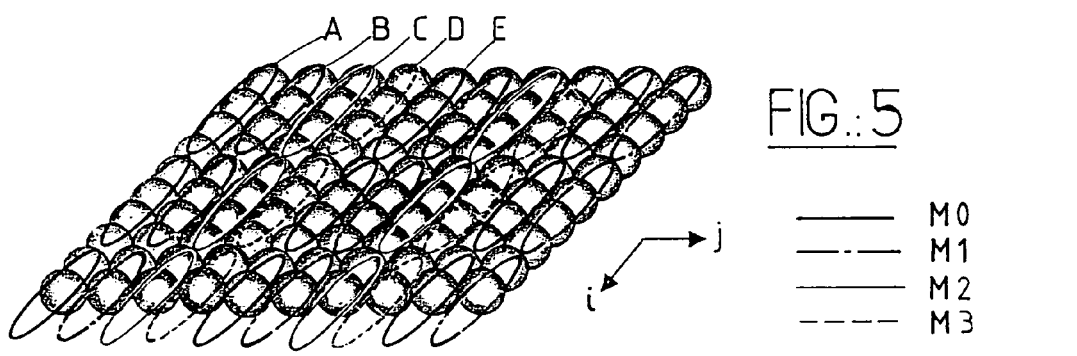
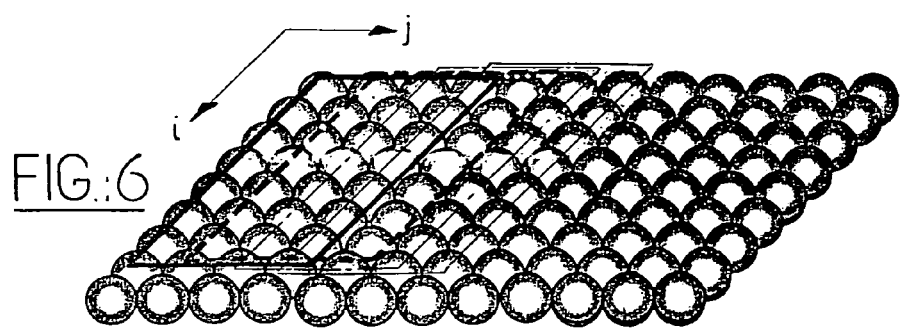

METHOD AND A SYSTEM FOR CALCULATING THE VALUES OF THE NEURONS OF A NEURAL NETWORK

BACKGROUND OF THE INVENTION

1. Field of the Invention

The present invention relates to a method of calculating the values of the neurons of a neural network and a to a system for implementing the method.

2. Description of the Prior Art

Prior art calculation methods calculate the value of each neuron of the neural network completely before beginning to calculate the value of the next neuron. This method necessitates many access cycles to memories in which the magnitudes contributing to the formation of the values of the neurons are stored These methods are therefore slow and imply a high consumption during calculation.

An object of the invention is to provide a calculation method and a system for implementing it that are free of the drawbacks referred to above.

SUMMARY OF THE INVENTION

The invention therefore provides a method of calculating values of neurons in a neural network comprising a plurality of layers of neurons, each of the layers comprising a plurality of sublayers of neurons, the value of each neuron (referred to as a "target neuron") being determined by the accumulation of products formed of the values of a plurality of neurons (referred to as "source neurons") forming, in a symbolic representation of the neural network, a parallelepiped in the underlying layer of the neural network and respective values of the same number of weights specific to each of the source neurons of the parallelepiped, the values of the weights being respectively the same in each parallelepiped determining the values of the target neurons in any sublayer of the underlying layer, which method comprises the following steps for calculating products determining the values of the target neurons of any sublayer of the network a) temporarily storing in memory at least one group of weights applying to the source neurons determining the values of the target neurons, b) calculating successively the products of all the target neurons of the sublayer concerned, c) storing temporarily all products obtained in this way relating to all the target neurons concerned, and d) accumulating the respective products obtained for each target neuron to form the value thereof.

Thanks to the above features, it is possible to calculate the target neurons of the same sublayer using the same group of weights, and it is sufficient to extract the weights once only from a weights memory. It is therefore possible to reduce considerably the memory access cycles and thus the consumption necessary for effecting the calculations.

Other features of the method according to the invention are as follows:

the group of weights is formed by weights applying to the source neurons situated in a slice of source neurons of each of the parallelepipeds corresponding to a sublayer and the operation b) is effected successively for all the slices of source neurons situated in the same sublayer of source neurons before proceeding to the accumulation operation;

the group of weights is formed by weights applying to all the source neurons of each of the parallelepipeds and the operation b) is effected at the same time for all the source neurons in the parallelepiped before proceeding to the accumulation operation;

the products formed of weights applying to all the source neurons of a plurality of the parallelepipeds and the related source neuron values are calculated in parallel;

the products to be accumulated to constitute the values of the target neurons of the same sublayer are calculated successively, each time with an offset by a predetermined step of the source neurons relating to the products in the underlying layer;

the offset is effected first in a first direction in the plane of the underlying layer concerned and then in a second direction perpendicular to the first direction; and the parallelepipeds are rectangular parallelepipeds.

The invention further provides a calculation system for implementing a method according to the invention, which system includes:

first memory means for storing values of source neurons in accordance with a predetermined storage scheme, second storage means for storing respective weights applying to all the neurons of the neural network, first temporary storage means for temporarily storing a predetermined portion of the source neuron values stored in the first storage means, the predetermined portion comprising at least one set of source neuron values contributing to forming the values of target neurons situated in the same sublayer of the neural network, second temporary storage means for temporarily storing predetermined groups of weights extracted from the second storage means, each group of weights relating to one of the sets of source neuron values, third temporary storage means for storing intermediate calculation results, calculation means adapted to form successive intermediate results constituted of products of the values of source neurons belonging to the sets of source neurons and weights relating thereto, the calculation means being also adapted to place the intermediate results in the third temporary storage means, and accumulator means for accumulating the intermediate results stored in the third temporary storage means and respectively relating to the same target neuron.

The first temporary storage means preferably comprise two banks of registers each of which has a storage capacity enabling it to store the predetermined portion of the source neuron values.

Other features and advantages of the present invention will become apparent in the course of the following description, which is given by way of example only and with reference to the accompanying drawings.

BRIEF DESCRIPTION OF THE DRAWINGS

FIG. 1 is a symbolic representation of a known neural network for scanning and coding image information, for example, and in which a method according to the invention can be employed.

FIG. 2 shows a portion of the neural network from FIG. 1 to show how the value of a neuron can be calculated by a method according to the invention.

FIG. 4 shows a portion of the network from FIG. 1, to show how neuron values are transferred to banks of registers for processing in a calculation unit designed to obtain values of target neurons from source neurons.

FIG. 5 shows a portion of the network from FIG. 1, to show how the values of the source neurons are stored in various memories of the calculation system from FIG. 5.

FIG. 6 shows a portion of the neural network from FIG. 1, to show how the calculation of the values of the target neurons progresses laterally in sublayers of the network.

DETAILED DESCRIPTION OF THE PREFERRED EMBODIMENT

Figure 3:
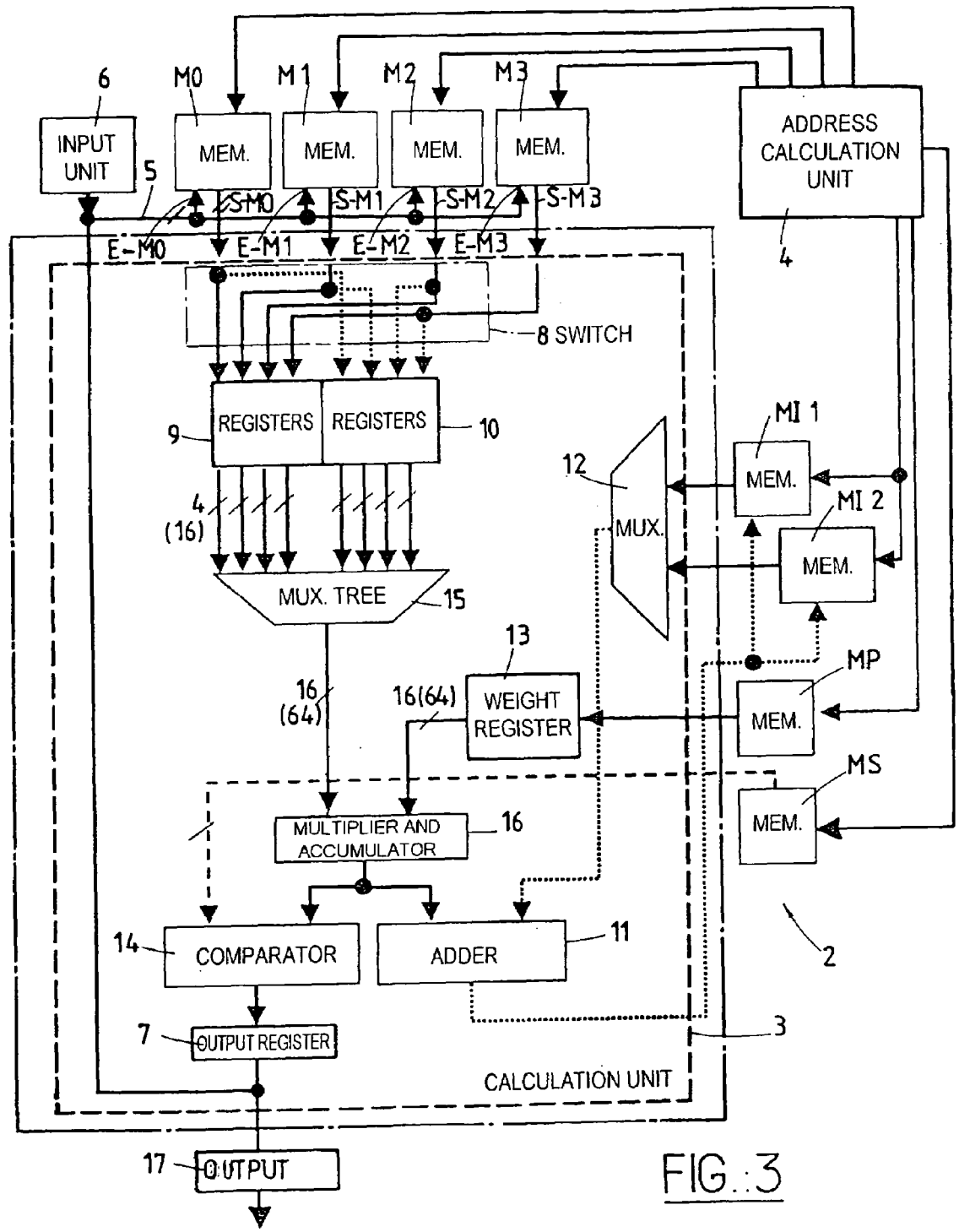
FIG. 3 is a simplified block diagram of a calculating system for implementing a method according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Turn now to FIG. 1, which is a symbolic representation of one example of a known neural network 1 to which a calculation method according to the invention can be applied.

In this example, it is assumed that the neural network 1 includes a matrix of photoelectric cells supplying input information to the neural network 1, the matrix observing an image I consisting here of a series of alphanumeric symbols SA that the neural network is to analyze.

However, the invention is not limited to analyzing optical signals. Thus the method according to the invention can be applied to neural networks whose input information is of any kind, as a function of the kind of matrix of sensors used at its input. Similarly, the configuration of the neural network shown in FIG. 1 is merely one example of a multitude of configurations that depend on how the input information is to be analyzed.

Using terminology adopted in this explanation and in the example shown, the neural network 1 includes four layers C1 to C4 of neurons, each layer comprising a number of sublayers S; the arrangement can be described by the following table:

TABLE

| Layer | Sublayer | Neurons per sublayer |
|---|---|---|
| 1 | 4 | 20*20 |
| 2 | 6 | 9*9 |
| 3 | 8 | 6*6 |
| 4 | 10 | 3*3 |

However, it will be evident to persons skilled in the art that the perspective representation of the neural network 1 given in FIG. 1 is merely symbolic, and that the neurons N can have any physical arrangement, determined above all by constraints governing its implementation on an integrated circuit chip. Also, each neuron N is symbolized by a ball whereas, of course, it consists in fact of an electronic circuit, the structure of which car be known in itself. It will also be noted that the neural network 1 cooperates with addressing means that are also known in the art, for selectively entering input signals into it and extracting output signals from it and addressing each of the neurons N that constitute it.

The lower sublayer of the lower layer C1, i.e. that which "sees" the image I, is formed of photo-electric sensors: this sublayer is therefore labeled PH The output signal of the neural network is supplied by the neurons of the last layer C4.

To identify the neurons in the neural network 1, a system of three-dimensional coordinates with axes (i, j, k) is defined, as represented beside the neural network 1 in FIG. 1.

To calculate the values of the "target" neurons, the following calculation rules are preferably applied within the context of a calculation method according to the invention. These rules are used in most known neural networks. The terms "preceding", "next", "lower" and "upper" are to be understood here as relating to the general direction of progression of information in the neural network 1, which in the FIG. 1 example is considered to go from the image I to the last layer C4. Furthermore, the expression "source neuron" refers to any neuron whose value contributes to calculating that of another neuron, which is referred to as a "target neuron".

Rule A: The value to be calculated of any target neuron is determined by the values of a predetermined number of source neurons of the preceding layer, these source neurons forming a parallelepiped, preferably a right-angled parallelepiped, in the symbolic representation of the neural network 1 illustrated by FIG. 1.

Rule B: The value of a target neuron to be calculated that is adjacent, with an offset of one step, a target neuron that has just been calculated in the same sublayer of the neural network 1 is also determined by the same number of source neurons forming a parallelepiped identical to the preceding layer offset by the same step.

Rule C: The value of any target neuron of the neural network 1 is obtained by the accumulation of products formed on the one hand by the values of the group of source neurons of the parallelepiped concerned multiplied by a group of the same number of factors, known as "weights", with one weight specific to each neuron, this group of weights being identical for all the target neurons of the same sublayer of the upper layer.

Rule D: All the neurons of the same column of neurons (arranged alone the axis (k)) are determined by the same input signals (i.e with the same source neurons; once again, this reduces the number of memory access cycles and consequently the consumption).

The rules just stated for calculating the neuron values are illustrated symbolically at a), b) and c) in FIG. 2.

FIG. 2 shows arbitrary portions of two layers Ca and Cb of the neural network 1, each of these layers here comprising four sublayers S of neurons N. In this figure, the origin of the frame of reference for these neurons is taken as the neuron in the bottom left-hand corner of the layer Ca or the layer Cb, and is designated $n_{(i0,j0,k0)}$.

It can be seen in FIG. 2a that the value of a target neuron $n_{(i0,j0,k0)}$ of the lower sublayer S of the upper layer Cb is determined by a group of source neurons of the lower layer Ca forming a rectangular parallelepiped PR1. In the example described, the parallelepiped is a cube whose sides each encompass four*four*four neurons, the corners of the parallelepiped PR1 being formed by the source neurons $n_{(i0,j0,k0)}$, $n_{(i0,j0,k3)}$, $n_{(i0,j3,k3)}$, $n_{(i0,j3,k0)}$, $n_{(i3,j3,k3)}$, $n_{(i3,j3,k0)}$, $n_{(i3,j0,k0)}$ and $n_{(i3,j0,k3)}$. As previously indicated, all the target neurons of the same column are calculated from the same source neurons and it is therefore possible to load the value of the latter once only for a whole column of target neurons.

In FIG. 2b, it can be seen that the value of the target neuron $n_{(i1,j0,k0)}$ situated in the same sublayer as the target neuron $n_{(i0,j0,k0)}$ and offset in that sublayer by a step d (here equal to one neuron) in the direction of the axis i is determined by another group of source neurons of the lower layer Ca, also in this example forming a cube PR2 having four*four*four neurons per side. The neurons at the corners of this second parallelepiped PR2 therefore have a coordinate on the axis i that is also offset by one neuron. As in this case the target neurons $n_{(i0,j0,k0)}$ and $n_{(i1,j0,k0)}$ are situated in the same sublayer, calculating their value uses the same set of sixty-four weights respectively assigned to the source neurons of the two parallelepipeds PR1 and PR2 What is more, the two parallelepipeds PR1 and PR2 are adjacent, and therefore have 32 neurons in common, which represents a further saving in terms of memory access cycles.

Accordingly, to calculate the value of any target neuron with coordinates $n_{(ix,jx,kx)}$, the value of each source neuron that contributes to forming the value of the target neuron must be Multiplied by the weight assigned to that source neuron and the intermediary results of all these multiplications accumulated.

FIG. 2c reflects one aspect of the basic concept of the present invention, namely that to calculate the values of two adjacent target neurons, for example those of the neurons $n_{(i0,j0,k0)}$ and $n_{(i1,j0,k0)}$, the calculation uses the values of the source neurons which have in common the parallelepipeds, here the parallelepipeds PR1 and PR2, whose source neurons give rise to the values of the two target neurons to be calculated. In the example shown in FIG. 2 three quarters of the neurons of the parallelepiped PR1, i.e. 32 neurons, are used again for the next calculation with the aid of the source neurons of the parallelepiped PR2.

The second aspect of the concept of the invention is that if the target neurons are situated in the same sublayer S, all of the weights assigned to the neurons are used again.

Finally, according to a third aspect of the invention already referred to, all the target neurons of the same column are calculated from the same source neurons.

FIG. 3 is a block diagram of one example of a calculation system 2 capable of implementing a method according to the invention and comprising a calculation unit 3 and a plurality of memories cooperating with an address calculation unit 4. It will be seen hereinafter that this calculation system 2 can take various forms, the simplest of which is described next.

The calculation system 2 comprises four memories M0 to M3 adapted to store values of neurons N of the neural network 1. These values are loaded at the beginning of a calculation process for all of the neurons via inputs E-M0 to E-M3 connected to a line 5 connected to an input unit 6 adapted to send to the memories M0 to M3 the values of the neurons in the sublayer PH under the layer C1, i.e. the neurons that pick up information from the image I. The line 5 is also connected to an output register 7 for transmitting to the memories M0 to M3 neuron values that have lust been calculated in the calculation unit 3 and which will be substituted for the earlier values of the corresponding target neurons.

The outputs S-M0 to S-M3 of the memories M0 to M3 are connected to a switch 8 which, using a method yet to be described, distribute the neuron values stored in the memories M0 to M3 in two banks of registers 9 and 10 of the calculation unit 3.

The calculation system 2 also includes two intermediate memories MI1 and MI2 whose inputs are connected to the output of an adder 11 and whose outputs are connected to a multiplexer 12.

A weights memory MP is also provided, with its output connected to a bank of weights registers 13 and a thresholds memory MS connected to a comparator unit 14.

The memories M0 to M3 and the memories MI1 and MI2 are RAM, whereas the memories MP and MS are ROM.

The outputs of the registers banks 9 and 10 are connected to a multiplexer tree 15. The output of this tree and the output of the bank of registers 13 are connected to a multiplier and accumulator unit 16 whose output is connected to the comparator 14 and to the adder 11. The latter also receives the outputs of the multiplexer 12.

It is to be noted that the values of the neurons N can be coded in any appropriate manner, although binary coding is preferred. They can be expressed on a number of bits that is chosen as a function of the resolution that it is required to assign to these neuron values.

The result of a complete calculation cycle is sampled on the output register 7, for example on the sublayers S of the layer C4 (FIG. 1). by an operating circuit 17. In the example shown, in which the neural network 1 is intended to read the digits from 1 to 10 from which the image I is composed, the digital output information respectively appears on the ten sublayers S of the layer C4.

The calculation operations necessary for obtaining the value of the target neurons is described next with reference to FIG. 3, already described, and to FIGS. 4 to 6, to which reference will be made as the description proceeds.

To calculate a given layer of the neural network 1, all of the values of the neurons of the preceding layer are stored in memory, preferably in accordance with a storage scheme shown in FIG. 5 Storage in the memories M0 to M3 is effected at the rate of sets of four neuron values per memory, each time with four contiguous sets of four values stored in the respective four memories. Accordingly, the values of four sets A, each of four neurons, all disposed along the axis i, are stored in the memory M0, those of four sets B, each of four neurons, all disposed along the axis i, and respectively contiguous in the direction j to the four sets A, are stored in the memory M1, those of four sets C, each of four neurons, also all disposed along the axis i, and respectively contiguous in the direction j to the four sets B, are stored in the memory M2, those of four sets D, each of four neurons, also all disposed along the axis i, and respectively contiguous in the direction j to the four sets C, are stored in the memory M3, and those of four sets E, each of four neurons, also all disposed along the axis i, and respectively contiguous in the direction j to the four sets D, are stored in the memory M0 again, and so on.

If a set comprises fewer than four neurons, the corresponding locations remain empty in the memories M0 to M3 on each occasion, as shown at the front edge of the sublayer of neurons from FIG. 5.

FIG. 4 shows a first phase of a calculation effected in a first embodiment of the calculation system 2. During this phase, chosen by way of example, a first intermediate result is constituted from all the values of the target neurons situated in the sublayer S1 of the layer Cb. The following description concerns only the first three target neurons $n_{(i0,j0,k0)}$, $n_{(i1,j0,k0)}$ and $n_{(i2,j0,k0)}$ of this sublayer S1, the corresponding intermediate results of the values of the other target neurons situated in this sublayer S1 being calculated in the same way (note that the same convention for designating neurons as that of FIG. 2 is used here).

In the variant of the calculation system 2 envisaged at this stage, for each target neuron, there are first calculated 16 products formed of the values of 16 source neurons at a time multiplied by 16 weights, these products being accumulated to form an intermediate result.

Accordingly, referring to FIG. 3 and FIG. 4, the thirty-two values of the source neurons of the rectangle at whose corners are situated the neurons $n_{(i0,j0,k3)}$, $n_{(i7,j0,k3)}$, $n_{(i7,j3,k3)}$ and $n_{(i0,j3,k3)}$ are extracted from the respective memories M0 to M3 in which they were stored at the outset. By controlling the multiplexer tree 15 appropriately, these values are then used in groups of 16 values multiplied each time by the same sixteen weight values placed only once in the weights registers bank 13 from the weights memory MP.

The first group of values comes from the source neurons contained in the square (i e. the "slice" of the parallelepiped PR1, see FIG. 2) whose corners are formed by the neurons $n_{(i0,j0,k3)}$, $n_{(i3,j0,k3)}$, $n_{(i3,j3,k3)}$ and $n_{(i0,j3,k3)}$ (see the representation at the bottom of FIG. 4a). In the multiplier and accumulator unit 16, the corresponding 16 values are multiplied by their respective 16 weights and the products are accumulated. The intermediate result is placed in one of the intermediate memories MI1 or MI2 so that it can subsequently be assigned to the neuron $n_{(i1,j0,k0)}$ of the sublayer S1.

Then, a new group of sixteen values corresponding to the source neurons $n_{(i4,j0,k3)}$, $n_{(i4,j0,k3)}$, $n_{(i4,j3,k3)}$ and $n_{(i1,j3,k3)}$, which group is offset along the axis i by the step d corresponding to one neuron, is taken from the registers bank 9 and distributed by the multiplexer tree 15. The values of this new group of source neurons are also multiplied by the same sixteen weight values, which are still in the bank 13, and the products are accumulated. The intermediate result is placed in the other of the intermediate memories MI1 or MI2 so that it can afterward be assigned to the target neuron $n_{(i1,j0,k0)}$ (see the bottom of FIG. 4b).

Then, the next group of sixteen values of the neurons $n_{(i2,j0,k3)}$, $n_{(i5,j0,k3)}$, $n_{(i5,j3,k3)}$ and $n_{(i2,j3,k3)}$ is extracted from the registers banks 9 and 10 and, after being distributed by the multiplexer tree 15, this group is processed in the same fashion, again using the same group of weights in the bank 13.

When the sixteen groups loaded into the two banks 9 and 10 have been processed, sixteen next new groups of source neuron values along the axis i are then loaded and the operations previously described are repeated When there remain no further neuron values to be processed along this axis, an offset in the direction of the axis j is effected by one step d corresponding to one neuron (see FIG. 6), and the same calculation process is executed for each group of sixteen values, still using the same weight values contained in the bank 13.

When all the values of the source neurons from the upper sublayer S4 of the lower layer Ca have been processed and the intermediate results stored in the memories MI1 and MI2, the process continues with analogous processing of the values of the source neurons from the sublayer S3, underlying the layer S4 in the layer Ca, and this calculation can, as already described, be performed with sixteen values at a time, although sixteen new weight values must be loaded into the weights bank 13 from the weights memory MP.

The intermediate results obtained during these calculations are placed in the other intermediate memory MI1 or MI2 and stored so that they can be accumulated in the adder 11 with the intermediate results previously calculated, it being understood that for a given target neuron only the intermediate results relating to it are taken into account. The accumulated result is again placed in one of the intermediate memories MI1 or MI2 so that it can be extracted therefrom when the calculation relates to the sixteen new values relating to the target neuron concerned, these new values then coming from the source neurons in the sublayer S2.

When the values of the source neurons from the four sublayers S1 to S4 of the lower layer Ca have been processed in this way, the required values of all the target neurons of the sublayer S1 are available. As and when they are produced, these values are compared in the comparator 14 to a threshold taken from the threshold values memory MS so that they can be adjusted to the resolution set for all of the calculations (the person skilled in the art refers to this operation as "thresholding"). The resulting values from the comparator 14 are passed to the output register 7, from which they are sent either to the memories M0 to M3, to be used for new calculations, or to the output unit 17, for output processing, in the case of target neurons of the last layer of the neural network 1. Generally speaking, the number of layers, the number of sublayers and the dimensions of the original parallelepipeds can be adapted to suit the application.

In a different variant of the invention, it is possible to reduce further the number of memory access cycles needed. To this end, instead of processing sixteen source neuron values at a time, it is possible to process all the source neuron values of an entire parallelepiped at the same time. For example, referring to FIG. 2a, it is possible to process all the neurons of the parallelepiped PR1, which amounts to increasing the parallelism of the calculations. In this case, the registers banks 9 and 10 must each store sixty-four values distributed by the multiplexing tree 15 so that each time the multiplier and accumulator unit 16 processes sixty-four values at the same time. The weights register must then be able to contain sixty-four weight values extracted at the same time from the weights memory MP.

In a third variant of the invention, it is also possible to provide a plurality of calculation units 3 operating in parallel.

The second and third variants of the calculation system 2 necessitate more hardware, but given that they considerably reduce memory access cycles, they have the advantage of operating faster and of reducing overall consumption.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method implemented on a computer of calculating values of neurons in a neural network that includes a plurality of layers of neurons, each of said layers having a plurality of sublayers of neurons, the value of a target neuron in a first layer being determined by an accumulation of products formed of the values of a plurality of source neurons in a second layer underlying said first layer, said source neurons forming, in a symbolic representation of the neural network, a parallelepiped in said second underlying layer of said neural network, weights specific to each of said source neurons of said parallelepiped being the same for all of the source neurons in a given sublayer of said underlying layer, said method comprising the following steps for calculating products determining said values of said target neurons of any sublayer of said network:
  storing in a weight register bank in said computer at least one group of weights that apply to a first sublayer of said source neurons to be used for determining said target neuron value;
  calculating successively the respective products of the values of said source neurons of said first sublayer and the weights associated therewith;
  storing said products relating to said source neurons of said first sublayer in a memory in said computer;

accumulating the respective products obtained from said source neurons relating to said target neuron to form said target neuron value; and using said target neuron value by said neural network to analyze input data and produce an output in accordance with a neural network application.

2. The method claimed in claim 1 wherein said group of weights is formed by weights that apply to said source neurons situated in a slice of source neurons of each of a plurality of parallelepipeds corresponding to a sublayer, and said step of calculating is effected successively for all said slices of source neurons situated in the same sublayer of source neurons before proceeding to the step of accumulating.

3. The method claimed in claim 1 wherein said group of weights is formed by weights that apply to all said source neurons of each of a plurality of parallelepipeds corresponding to a sublayer, and said step of calculating is effected at the same time for all said source neurons in said parallelepipeds before proceeding to the accumulation operation.

4. The method according to claim 3, wherein said products formed of weights applying to all said source neurons of said plurality of parallelepipeds and the related source neuron values are calculated in parallel.

5. The method claimed in claim 1 wherein said products to be accumulated from the same sublayer to constitute said target neuron value are calculated successively, each time with an offset by a predetermined step of said source neurons relating to said products in the underlying layer.

6. The method claimed in claim 5 wherein said offset is effected first in a first direction in the plane of the underlying layer concerned and then in a second direction perpendicular to said first direction.

7. The method claimed in claim 2 wherein said parallelepipeds are rectangular parallelepipeds.

8. A computer-implemented neural network comprising:
a plurality of layers of neurons, each of said layers having a plurality of sublayers of neurons, the value of a target neuron in a first layer being determined by an accumulation of products formed of the values of a plurality of source neurons in a second layer underlying said first layer, said source neurons forming, in a symbolic representation of the neural network, a parallelepiped in said second underlying layer of said neural network, weights specific to each of said source neurons of said parallelepiped being the same for all of the source neurons in a given sublayer of said underlying layer;
an input unit providing input data to said plurality of layers of neurons, said input data to be analyzed by said neural network; and
an output unit for receiving neuron values from an uppermost layer of said plurality of layers and outputting said values for subsequent output processing according to an application of said neural network.

9. The neural network as set forth in claim 8, further comprising a first memory for storing values of said plurality of source neurons in accordance with a predetermined storage scheme, and a second memory for storing weights respectively associated with each of said neurons of said neural network.

10. The neural network as set forth in claim 9, further comprising a third memory for temporarily storing a predetermined portion of said source neuron values stored in said first memory, said predetermined portion including at least a first set of source neuron values contributing to forming the values of target neurons and situated in said same given sublayer.

11. The neural network as set forth in claim 10, further comprising a fourth memory for temporarily storing predetermined groups of weights extracted from said second memory, each group of weights relating to a corresponding set of source neuron values.

12. The neural network as set forth in claim 11, further comprising a fifth memory for storing intermediate calculation results output by a calculation unit, said calculation unit adapted to form successive intermediate results constituted of respective products of said sets of source neuron values and weights relating thereto.

13. The neural network as set forth in claim 12, further comprising an accumulator for accumulating said intermediate results stored in said fifth memory to define a target neuron value and for relating said target neuron value to said target neuron.

14. The neural network as set forth in claim 13, wherein said third memory includes two banks of registers each having a storage capacity enabling it to store said predetermined portion of said source neuron values.

15. The neural network as set forth in claim 14, wherein said input unit includes a matrix of sensors.

16. A neural network implemented on an integrated circuit chip comprising:
a plurality of layers of neurons, each of said layers having a plurality of sublayers of neurons, said neurons including electronic circuits;
a calculating unit for determining the value of a target neuron in a first layer by accumulating products formed of the values of a plurality of source neurons in a second layer underlying said first layer, said source neurons forming, in a symbolic representation of the neural network, a parallelepiped in said second underlying layer of said neural network, weights specific to each of said source neurons of said parallelepiped being the same for all of the source neurons in a given sublayer of said underlying layer;
a weights memory for storing weights associated with said source neurons;
a weight register bank for loading a subset of said weights pertaining to said source neurons of said sublayer; and
a multiplier and accumulator unit for forming and accumulating said products using said subset of weights as loaded to said weight register bank once for all of said source neurons of said sublayer.

17. The neural network as set forth in claim 16, further comprising a computer-implemented addressing unit for entering input signals to said neural network and extracting output signals from said neural network.

* * * * *